Figure 1:
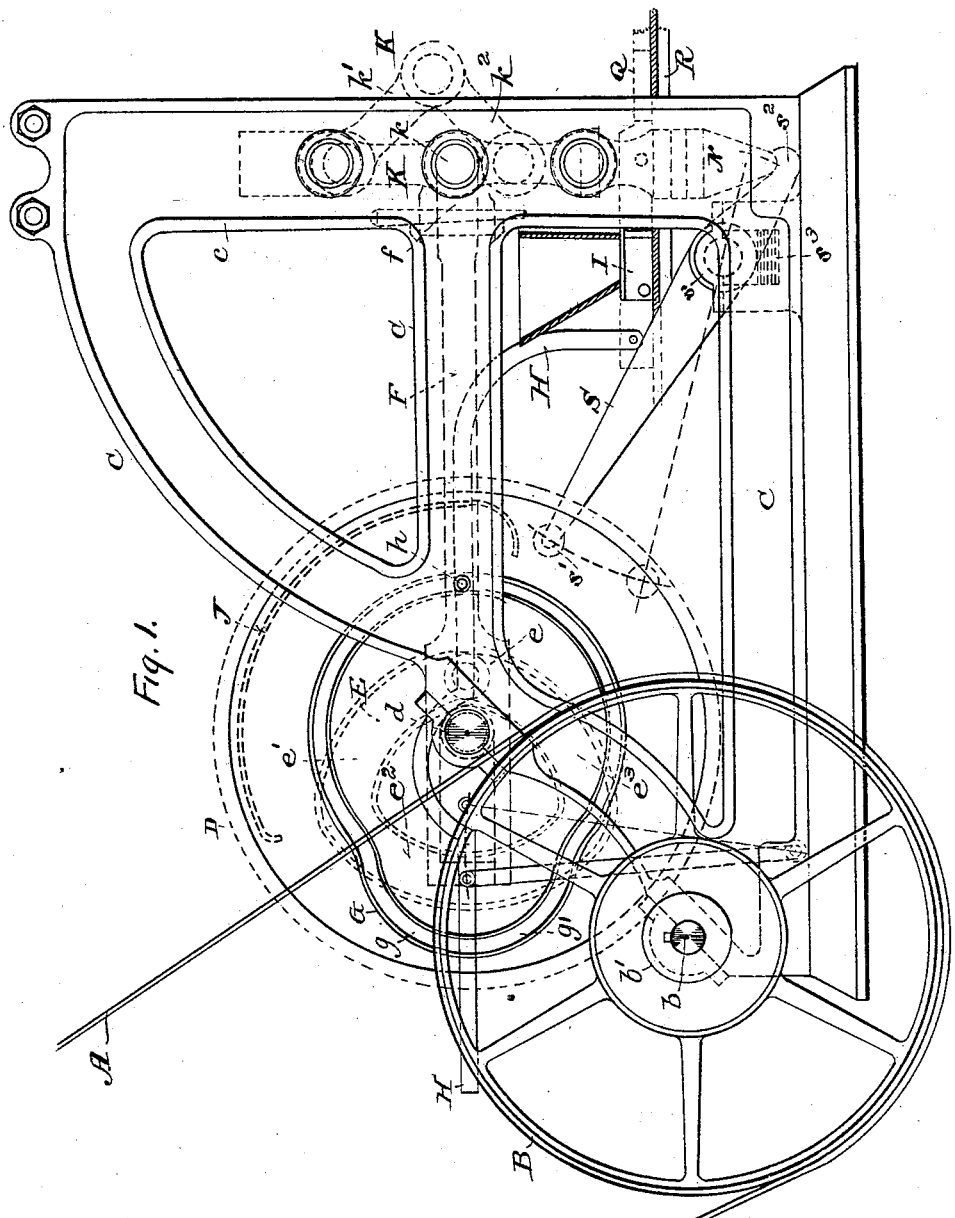

(No Model.) 6 Sheets—Sheet 1.

J. J. KULAGE.
BRICK MACHINE.

No. 452,710. Patented May 19, 1891.

Witnesses: Inventor:
Joseph J. Kulage
by C. D. Moody
his atty

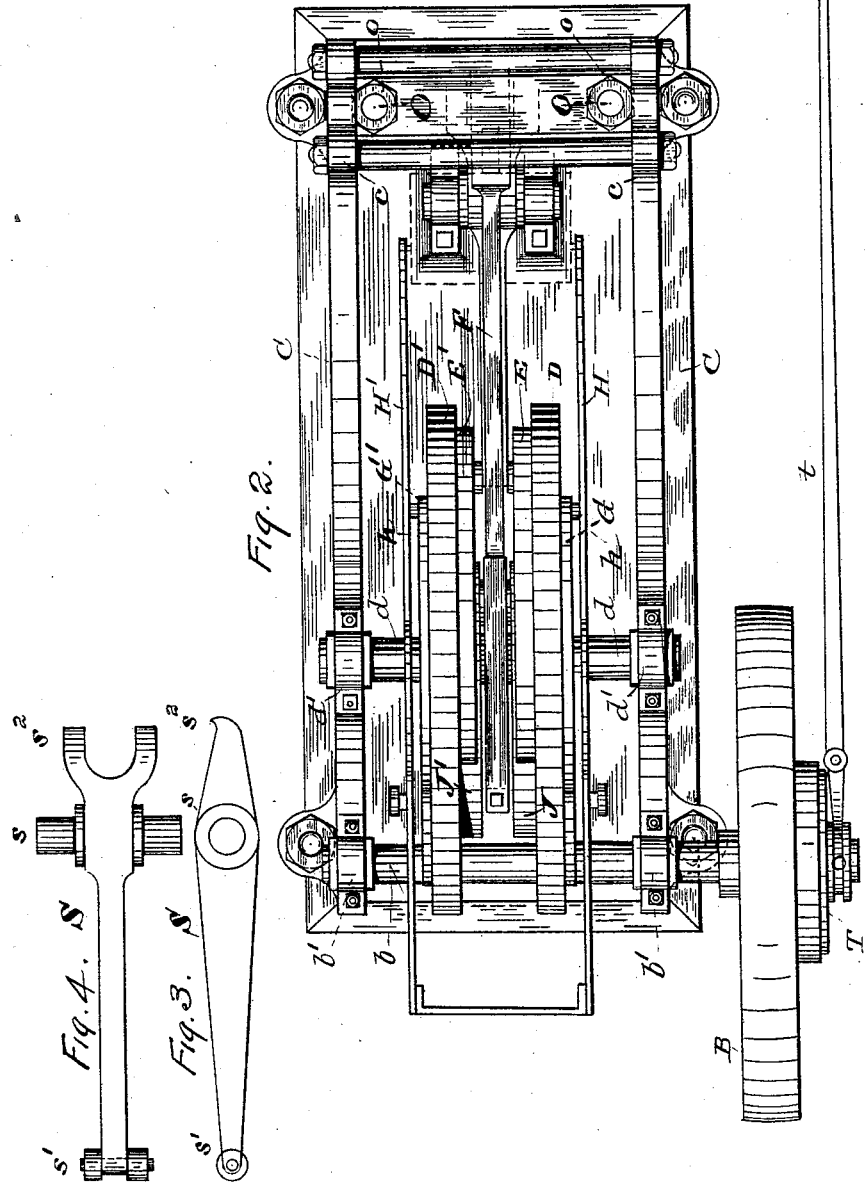

(No Model.) 6 Sheets—Sheet 3.
J. J. KULAGE.
BRICK MACHINE.
No. 452,710. Patented May 19, 1891.
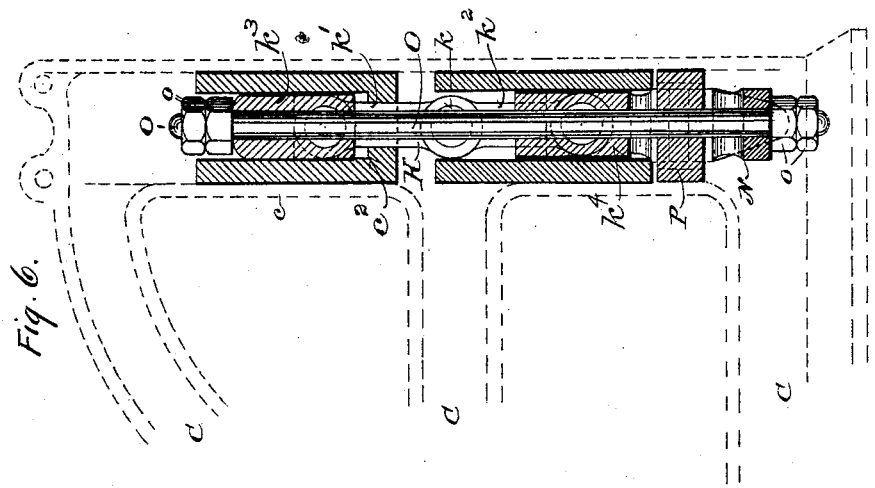
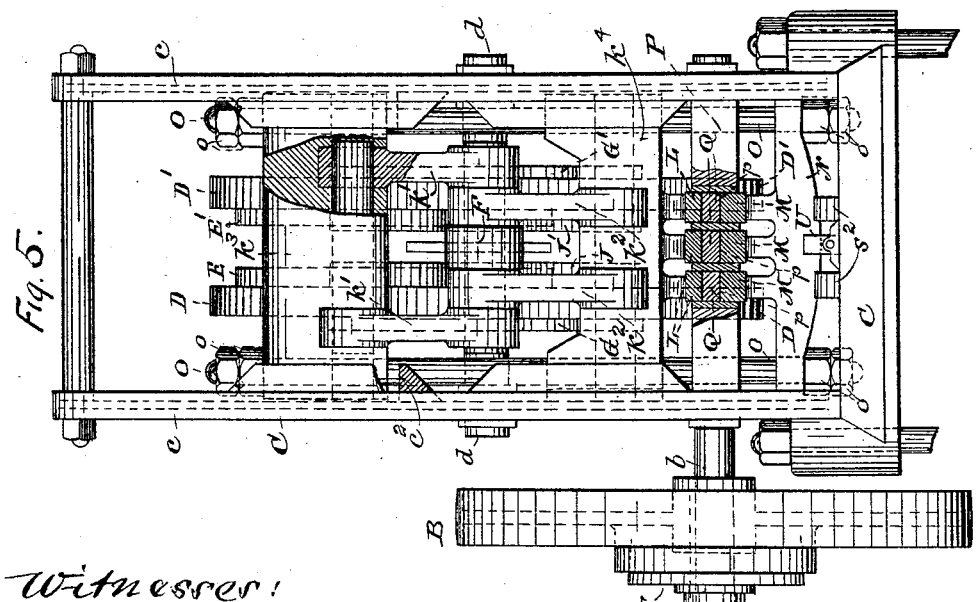
Witnesses:
Inventor:
Joseph J. Kulage
by C. D. Moody
his atty (No Model.) J. J. KULAGE. 6 Sheets—Sheet 4.
BRICK MACHINE.
No. 452,710. Patented May 19, 1891.
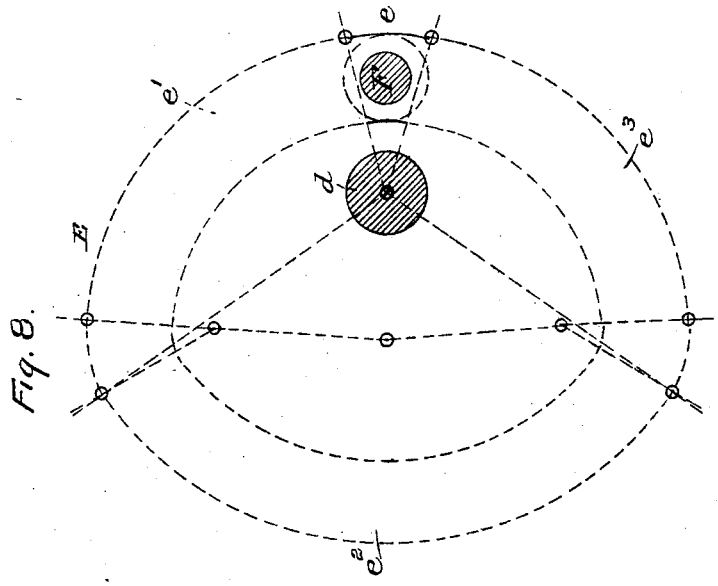
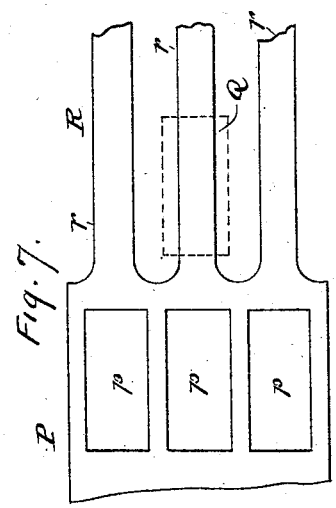
Witnesses: Inventor:
Joseph J. Kulage
by C. D. Moody
his atty

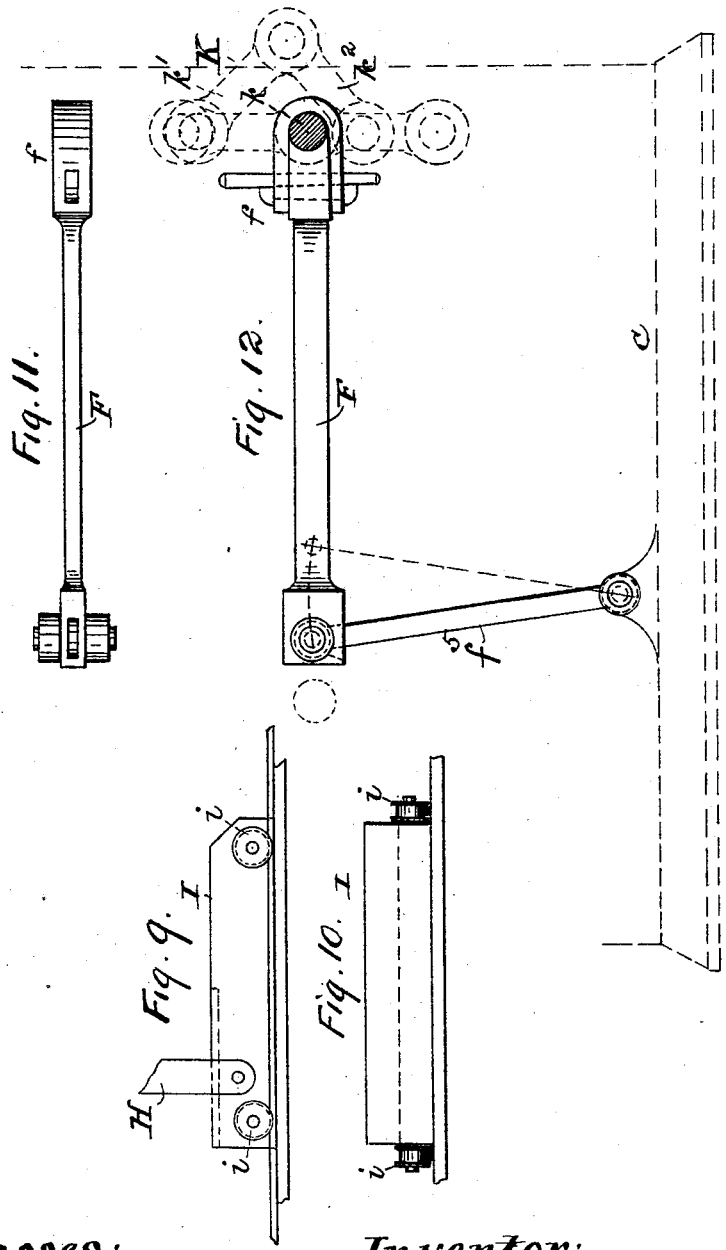

(No Model.)  J. J. KULAGE.  6 Sheets—Sheet 6.
BRICK MACHINE.
No. 452,710.  Patented May 19, 1891.
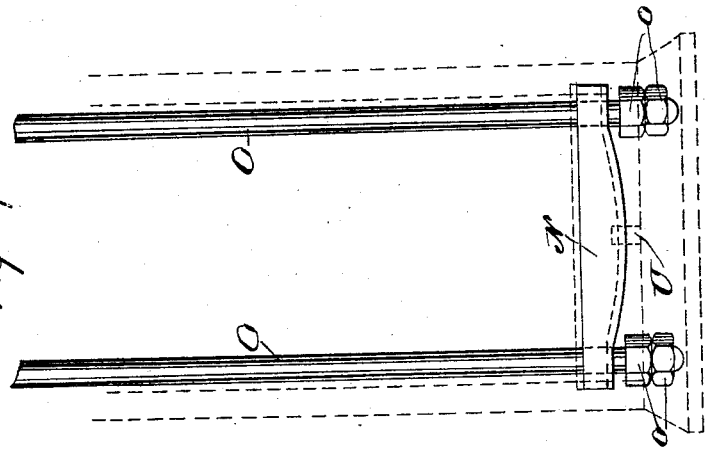
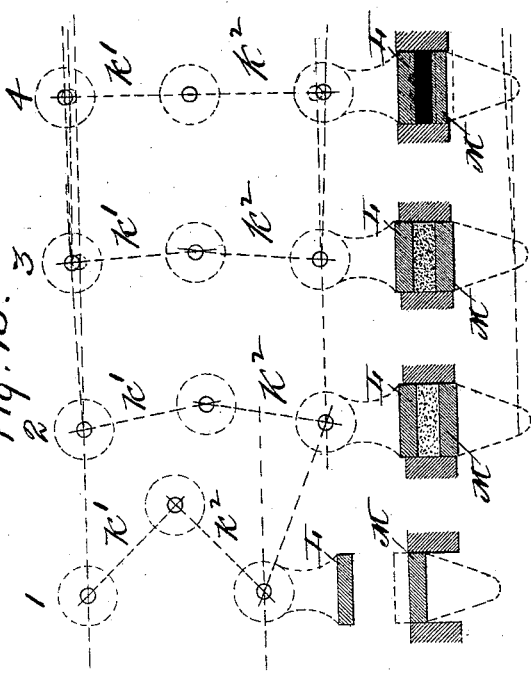
Witnesses:
Inventor:
Joseph J. Kulage
by C. D. Moody
his atty

UNITED STATES PATENT OFFICE.

JOSEPH J. KULAGE, OF ST. LOUIS, MISSOURI.

BRICK-MACHINE.

SPECIFICATION forming part of Letters Patent No. 452,710, dated May 19, 1891.

Application filed January 30, 1890. Renewed November 8, 1890. Serial No. 370,720. (No model.)

*To all whom it may concern:*

Be it known that I, JOSEPH J. KULAGE, of St. Louis, Missouri, have made a new and useful Improvement in Brick-Machines, of which the following is a full, clear, and exact description.

The present machine may be classified with those employing an upper and a lower plunger, the plungers moving vertically and opening apart from each other to admit between them the laterally-moving charger conveying the clay to the molds and after the withdrawal of the charger closing toward each other to form the bricks in the molds.

The improvement in question has for its object to provide a durable brick-machine, simple in its design and operation, and adapted to workmen of ordinary skill.

The improvement relates partly to the means whereby a large portion of the weight of the pressing mechanism is utilized in producing the initial pressure upon the clay and expelling the air therefrom; partly in the means whereby the full pressure is maintained upon the bricks in the molds for a brief period and a better result thereby obtained; partly in the means whereby the movement of the charger is facilitated; partly in the improved means for discharging the bricks from the molds; partly in the means for operating the pressing mechanism, the mold-charging mechanism, and the brick-discharging mechanism; partly in the means for adjusting the capacity of the molds; partly in the means for regulating the thickness of the bricks, and partly in other and minor features of the construction, all substantially as is hereinafter set forth and claimed, aided by the annexed drawings, making part of the specification, in which—

Figure 1 is a side elevation of the improved machine, a portion—namely, the charger and table—being in section; Fig. 2, a plan of the machine; Fig. 3, a bottom view of the lever used in effecting the discharge of the bricks from the molds; Fig. 4, a side elevation of the same; Fig. 5, a front elevation of the machine, the plungers, molds, and interposed brick being in section; Fig. 6, a sectional elevation of the pressing mechanism, portions of the frame being indicated by the broken lines; Fig. 7, a plan of the mold and table; Fig. 8, a diagram used to illustrate the cam used in operating the pitman which leads to the toggle, the main shaft which supports the gears having the cam and the cross-head at the end of the pitman being shown in section; Figs. 9 and 10, respectively, a side elevation and an end elevation of the charger; Figs. 11 and 12, views illustrating a modification of the pitman, Fig. 11 being a top view of the modified pitman, and Fig. 12 a side elevation of the same and indicating the frame and toggle in broken lines; and Figs. 13 and 14, diagrams illustrating the operation of the improved mechanism.

The same letters and figures of reference denote the same parts.

Motion is imparted to the machine in any desirable manner—say by a belt A, leading to a pulley B on the shaft $b$, journaled at $b'$ $b'$ in the frame C of the machine and carrying pinions (not shown) which engage, respectively, with the gear-wheels D D'. These last-named wheels are attached to a shaft $d$, which is journaled at $d'$ $d'$ in the frame C, and their motion is transmitted to three different mechanisms of the machine—namely, to the pressing mechanism, to the mold-charging mechanism, and to the mechanism by which the bricks are discharged from the molds. To these ends the wheels D D' are provided with three cams, each of which is preferably made in pairs or two parts—that is, E E' represent a two-part cam whose parts E and E' are attached, respectively, to the wheels D D', and respectively upon the inner sides of said wheels, by which arrangement the cam parts E E' are caused to face each other. F represents a pitman whose cross-head works in the cam parts E E', and which transmits their motion to the pressing mechanism. G G' represent the two-part cam for operating the mold-charging mechanism. The parts G and G' are attached, respectively, to the wheels D D', and respectively upon the outer faces of the said wheels. The arms H H' at the rear end $h$ thereof engage, respectively, in the cam parts G G' and transmit their motion to the charger I. The parts J J' of the brick-discharging mechanism are attached, respectively, to the wheels D D', and respectively upon the inner sides thereof.

The respective shapes of the various cams described, and also their arrangement, can be understood by referring to Figs. 1 and 2, and the cam E E' is further explained by the diagram of Fig. 8, and will also be hereinafter further explained. The pitman F at its forward end $f$ is jointed to the toggle K, the pitman being connected with the pin $k$, which unites the upper $k'$ $k'$ with the lower $k^2$ $k^2$ links of the toggle. The upper links at the upper end thereof are jointed to the cross-head $k^3$, and the lower links at the lower end thereof are jointed to the cross-head $k^4$. The upper plungers L are attached to the lower cross-head $k^4$. The lower plungers M are attached to a third cross-head N, which in turn and by means of the rods O is connected with the upper cross-head $k^3$, so that the two cross-heads $k^3$ N move upward together. The three cross-heads are held and guided in their vertical movements by the uprights $c$ $c$ of the frame C, and substantially as shown.

P represents the mold, having as many compartments $p$ as may be desired.

Q Q Q, Fig. 5, represent bricks formed in the molds. The mold at its ends is attached to the uprights $c$ $c$. The mold and the middle cross-head $k^4$ are suitably shaped to admit of the rods O passing them. The charger I works across the mold, as indicated by the two positions shown, respectively, in the full and the broken lines, Fig. 1.

R represents the table in front of the mold, and upon which the bricks are delivered from the mold.

S represents the lever which transmits the motion of the cam parts J J'. It is pivoted, at $s$, in a bearing in the frame C. Its rear end $s'$ is adapted to be moved by the cam parts J J'. Its forward end $s^2$ is forked and adapted to come beneath the lower cross-head N, and when the rear end of the lever S is depressed its forward end acts to lift the cross-head N and lower plungers, and the bricks Q are thereby ejected from the molds. The bearing $s$, by means of the invertible plates $s^3$, Fig. 1, can be vertically adjusted—that is, by inserting more of the plates $s^3$ beneath the bearing $s$ the lower plungers M are raised to a higher level by the action of the lever S, and when some of the plates are withdrawn the lower plungers are not raised as high. By this means the brick-discharging mechanism can be adjusted to any variance resulting from wear and tear or other cause in the height of the mold.

The rods O O are connected with the upper and lower cross-heads by means of the nuts $o$. By this means the distance between the upper and lower cross-heads can be adjusted from time to time, as when the parts connected with the pressing mechanism become worn, or as when a new mold is inserted in the place of an old one, or, and especially, as when it is desired to alter the thickness of the bricks.

The operation of the improved machine is as follows: In Fig. 1 the final pressure is being applied to the clay in the molds, and at this time the pitman F is in engagement with the portion $e$ of the cam E E'. This portion is an arc whose center is the shaft $d$, and in consequence the final pressure is maintained for a brief period and until the cam portion $e$ passes the pitman cross-head. This maintaining of the final pressure is advantageous, in that thereby the particles of the clay are more compacted in the bricks. The portion $e'$ of the cam now acts upon the pitman, causing the toggle to open, as indicated by the broken lines, Fig. 1, and the upper plungers to rise out and above the molds. As soon as this movement has been sufficiently initiated the cams J J' encounter the lever S, and the previously-formed bricks are thereby ejected from the molds. The portion $e'$ is substantially a quarter-turn, and after it has passed the pitman cross-head the cam G G' acts upon the charger-arm to move it and the charger forward to cause the charger to come over the molds and to deposit another lot of clay—that is, the portion $g$ of the cam G G' produces this result. Just as the cam portion $g$ is beginning to act upon the charger the cams J J' have ceased to act upon the lever S and the lower plungers have dropped to the bottom of the molds. The portion $g'$ of the cam G G' now acts to effect the withdrawal of the charger out of the way of the toggle, and by this time the portion $e^2$ of the cam E E', which portion is an arc whose center is the shaft $d$, has passed the pitman cross-head, and the portion $e^3$ of the cam E E' is acting upon the pitman. The toggle is now being closed. As the toggle closes the following occurs: The lower plunger moves downward, and meanwhile the upper cross-head $k^3$ is resting upon the ledge $c^2$ of the frame C. The weight of the principal portion of the toggle, also of the middle cross-head and of the lower plungers, is upon the clay in the molds, in addition to the pressure positively exerted upon the clay by the action of the pitman. This combined pressure continues and increases until the resistance is sufficient to react upon the upper cross-head $k^3$ and cause it to rise from the ledge $c^2$. The rising of the upper cross-head causes the rods and the lower cross-head and plungers to rise, and the final pressure is thereby applied to both the under and the upper sides of the bricks. The operation is then repeated. As the bricks are discharged from the molds they are by the forward movement of the charger pushed out upon the table, substantially as is customary; but to prevent the loose particles of clay which may be present from being too much in the way of the bricks the table is made in the form of narrow bars $r$, narrower than the width of the brick, whereby the particles in question have ample opportunity to drop out of the way.

A feature of the charger is considered important. As hitherto made, the movement of the charger has been interfered with by the dirt between the charger and the table beneath. This difficulty is obviated by providing the charger with rollers $i$, substantially as shown, which bear upon the table and serve to uphold the charger.

T and $t$ respectively represent a clutch and lever, of ordinary construction, used in starting and stopping the machine.

I desire not to be restricted to the cam E E' precisely as shown—that is to say, its various parts $e\ e'\ e^2\ e^3$ can be variously differently proportioned relatively. The part $e$, for instance, may be longer and the other parts $e'\ e^2\ e^3$, or any of them, may be shorter, and so in turn each of the other parts may be somewhat altered in length. The various curves, respectively, of the parts $e'\ e^3$ may also be somewhat changed, all, however, provided the movements of the pressing and other described mechanisms are effected substantially in the manner described.

The pitman F at its rear end may be variously supported. In Figs. 1 and 2 its rear end is shown slotted to pass onto and to ride upon the shaft $d$. In Fig. 12 the pitman is shown supported by a swinging pivoted leg $f^5$; or, if desired, the pitman may be suspended at its rear end, for I desire to uphold the rear end of the pitman by any suitable means so long as it can be made to engage with the cam E E', substantially as set forth.

U represents a device for sustaining the lower cross-head N when that part is not sustained by the rods O O, and also for adjusting the height at which it is desired from time to time the lower plunger shall stand in the molds.

The consistency of clay as it comes in practice to the molds of a brick-machine is continually varying. It is desirable for a fixed weight of clay to enter into a brick, and to this end means—such as the device U, and which in practice is virtually a wedge adapted to be readily inserted farther in beneath or withdrawn farther out from beneath the cross-head N—are employed by which the depth of the molds can be adjusted to suit the nature of the clay. If the clay is less compacted, the device U is adjusted to lower the cross-head N. If more compacted, the device is adjusted to raise the cross-head. Any equivalent means can be substituted for thus adjusting the level to which the lower plunger shall drop.

An important feature of the present machine is the manner in which the pressure is applied to the clay in the molds. That this may be better understood reference is asked to Figs. 13 and 14 of the drawings, which, respectively, are a diagram showing the relative positions of the plungers at the various stages of the pressing and an elevation of the lower cross-head and the rods which, during one stage of the pressing, serve to raise it. The figure also, in broken lines, shows a portion of the frame and the device for adjusting the level to which the cross-head shall drop.

In Fig. 13 four positions of the plungers and toggle are shown. The left-hand position 1 shows the toggle wide open, the lower plunger flush with the top of the mold, and the upper plunger raised to its highest level to permit of the action of the charger. In the second position 2 the upper end of the toggle has not changed its position, but the weight of the toggle in part and of the outer end of the pitman has, and in connection with the action of the toggle, acted to effect the first pressure upon the clay, and the lower plungers have dropped to their lowest level and are sustained by the device U, as represented in Fig. 14.

In practice the depth of the clay in the molds prior to any pressing is on the average about five inches, and the thickness of the brick when finally pressed is, say, two and one-quarter inches—that is, the depth of the clay is diminished two and three-quarter inches. Of this amount of compression two inches are effected when the parts have reached the position just mentioned—namely, position 2. The clay is now sufficiently compacted to sustain the weight of the toggle and parts immediately therewith connected, including the upper cross-head, and the result is the lifting of the upper portion of the toggle and the upper cross-head as the toggle continues to close, and also the rods O, and the movement continues until the rods are raised sufficiently to cause the nuts $o$ at the lower end of the rods to come against the under side of the lower cross-head, as in Fig. 5. This is position 3 of the diagram.

A certain amount of time is required for the described parts to reach position 3, and meanwhile the depth of the clay in the molds is not diminished. This step in the pressing, however, is important, as thereby time is afforded for the air to leave the partially-pressed brick before the final pressure comes upon it, and the brick when ultimately formed is thereby improved. From position 3 the parts change into position 4 of the diagram. The toggle is now straightened, and in so doing it has applied the final pressure to the clay. This final pressure is applied substantially equally to the under and the upper surface of the clay, the lower plungers rising and the upper plungers descending in the molds.

I claim—

1. The combination of the wheels D D', the three cams, the pitman, the charger-arms, and the brick-discharging lever, said cam E E' having the portion $e$ between the portions $e'\ e^3$, substantially as described.

2. The combination of the wheels D D', the two-part cam E E', the pitman, the toggle, three cross-heads, rods, molds, and plungers, said cam E E' having the portion $e$ between the portions $e'\ e^3$, substantially as described.

3. The combination of the uprights $c\ c$, the ledge $c^2$, and the toggle, substantially as described.

4. The table R, having the narrow bars r, as and for the purpose described.

5. The combination of the toggle, three cross-heads, rods, molds, and plungers, said middle cross-head and upper plungers moving downwardly to their lower limit before the lower plungers rise, substantially as described.

Witness my hand this 10th day of January, 1890.

JOSEPH J. KULAGE.

Witnesses:
C. D. MOODY,
I. W. C. SANFORD.